Feb. 19, 1963   C. J. MATHEY   3,078,112
COUPLING FOR WIRE STRAND AND THE LIKE
Filed Jan. 12, 1961   2 Sheets-Sheet 1

INVENTOR.
Charles J. Mathey
BY
Frease, Bishop, Johns & Schick
ATTORNEYS

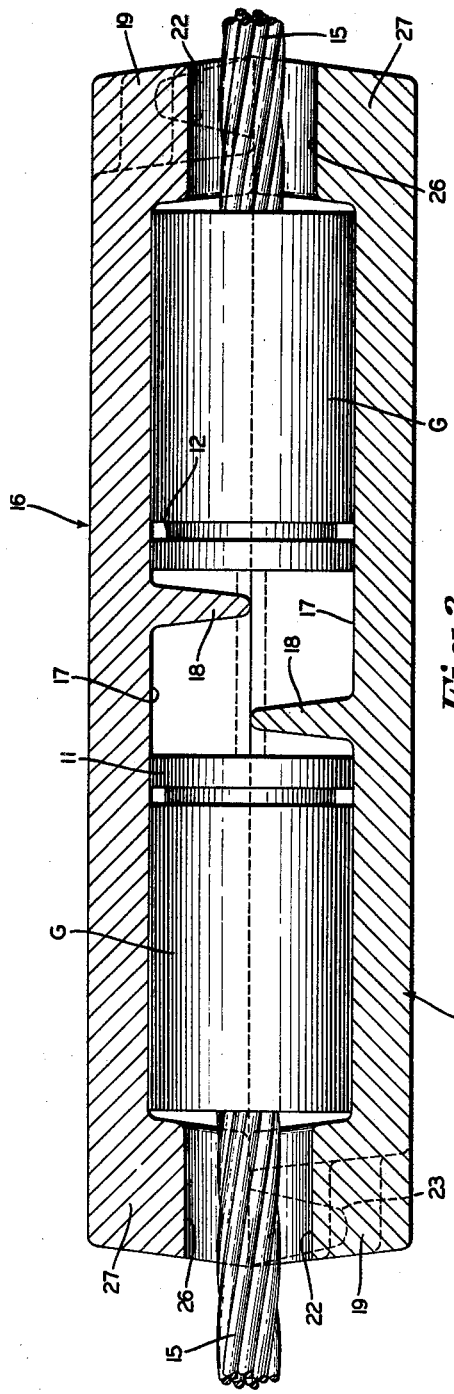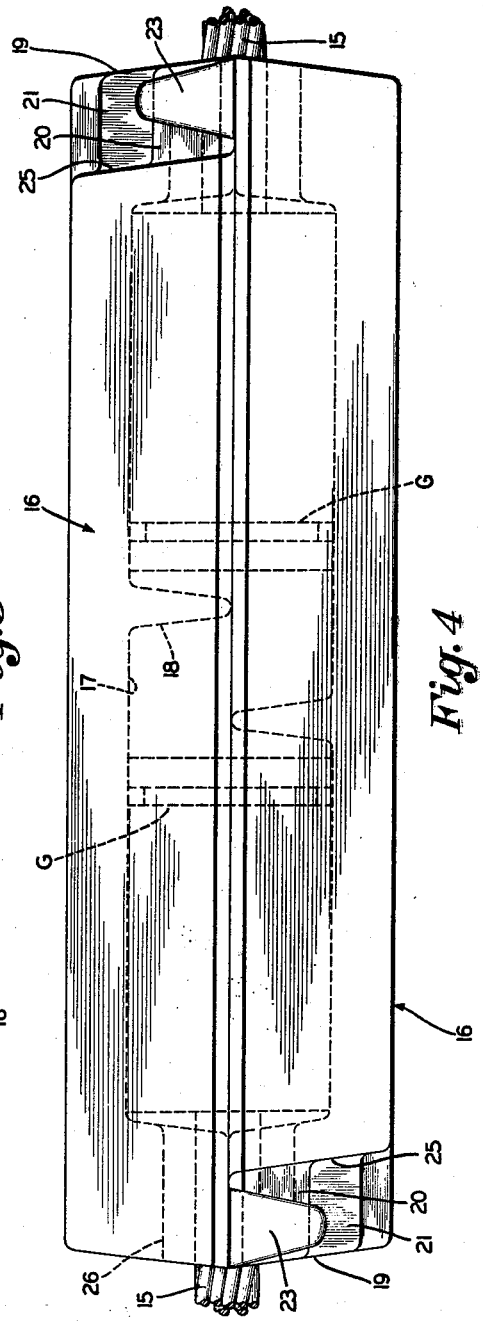

United States Patent Office 3,078,112
Patented Feb. 19, 1963

3,078,112
COUPLING FOR WIRE STRAND AND THE LIKE
Charles J. Mathey, Canton, Ohio, assignor, by mesne assignments, to The Union Metal Manufacturing Company, Canton, Ohio, a corporation of Ohio
Filed Jan. 12, 1961, Ser. No. 82,269
4 Claims. (Cl. 287—76)

The invention relates to couplings for wire strand and the like, and more particularly to such a coupling especially adapted for use in pre-stressed concrete work.

In the construction of pre-stressed concrete structures, wire strand, steel rods or the like are held under tension in the form in which the concrete is molded so as to embed the wire strand or rods in the concrete. Opposite ends of the wire strand are ordinarily held in chucks, or friction grip devices, between which the wire strand is placed under tension.

In order to conserve remnants of wire strand shorter than the length of the concrete structure to be formed, it is common practice to couple opposed ends of short lengths of wire strand together.

The present invention pertains to such a coupling device whereby the opposed ends of wire strand may be held in the usual chucks or grip devices and enclosed within a coupling in the form of a separable housing whereby the coupled wire strand may be placed under tension.

The improved coupling is in the form of a housing comprising two similar, separable halves, each having a transverse partition therein acting as stops for the opposed ends of the wire strand.

The two similar halves of the housing are adapted to be longitudinally slidably moved relative to each other, whereby interengaging ears and bosses at the ends of the two halves will lock the halves of the housing together enclosing the chucks or grip devices attached to opposed ends of the wire strand.

It is an object of the invention to provide a coupling for wire strand and the like comprising an elongated housing for receiving and holding chucks or grip devices upon opposed ends of the wire strand.

Another object of the invention is to provide such a coupling comprising a housing formed of two similar separable parts.

A further object of the invention is to provide such a coupling comprising a housing formed of two identical halves, there being interengaging ears and lugs upon opposite ends of the two halves for locking the two parts of the housing together.

It is also an object of the invention to provide a coupling of this character in which the two halves of the housing are locked together by relative longitudinal movement of the two halves.

Another object of the invention is to provide such a coupling comprising a housing formed of two identical halves, each half of the housing having a semi-cylindrical pocket therein for receiving chucks or grip devices upon opposed ends of the wire strand, there being a transverse partition within each housing, a pair of converging ears upon one end of each housing and a lug upon the other end thereof for interlocking the two halves together.

Reference is now made to the drawings showing a preferred embodiment of the invention, in which;

FIG. 3 is a longitudinal sectional view through the housing, showing the two parts thereof in assembled or locked position for coupling opposed ends of wire strand;

FIG. 4 is a side elevation of the coupling in use; and,

Figure 1:
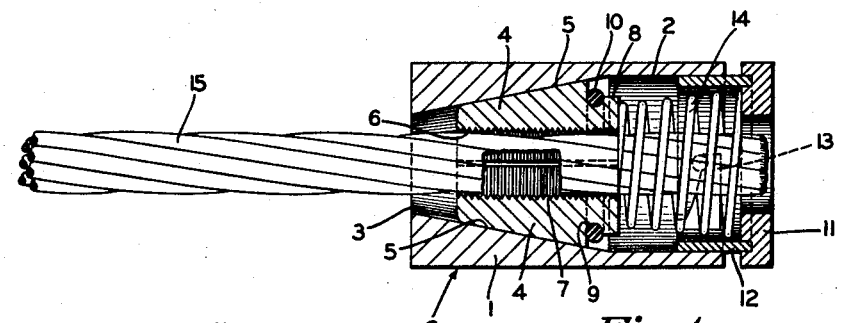
FIG. 1 is a longitudinal sectional view through a chuck or grip device frictionally holding one end of a wire strand.

Referring now more particularly to the embodiment of the invention illustrated, in which similar numerals refer to similar parts throughout, the chuck or grip device for holding an end of a wire strand or the like, indicated generally at G, is shown in detail in FIG. 1 and comprises a cylindrical sleeve 1 having internal bore 2 tapered toward one end as indicated at 3.

A clip or jaw assembly is located within the bore of the sleeve 1 and comprises a plurality, preferably four, segmental jaws 4, each having a tapered outer surface 5 forming part of a complete cone, and each having a longitudinal recess 6, arcuate in cross section and provided with the transversely disposed serrations 7.

A reduced neck 8 is formed upon the larger end of each of the segments or jaws 4, having a peripheral groove 9 therein to receive an O-ring 10 of plastic, rubber or the like for holding the jaws or segments in assembled condition.

A cap 11 is provided with an annular flange 12, received within the straight portion 2 of the bore of the sleeve 1 and adapted to be connected to the sleeve by any usual and well known means, such as the bayonet lock indicated at 13.

A coil spring 14 is interposed between the cap 11 and the adjacent end of the grip or jaw assembly 4—4 to normally urge the same into the tapered bore 5 of the sleeve. In order to attach the chuck or grip device to a wire strand, rod or the like, the wire strand, indicated at 15, is inserted into the sleeve through the smaller end of the tapered bore 3 thereof and into the serrated central opening in the jaw or grip assembly as shown in FIG. 1, spreading the jaws apart at their smaller ends so that the outer surfaces thereof substantially contact the tapered bore 3 of the sleeve.

The wire strand may be easily inserted into the chuck in this manner, but any pull upon the wire strand in the opposite direction tends to more tightly grip the same between the jaws 4. Chucks of this general character are ordinarily attached to opposite ends of the wire strand used in pre-stressed concrete construction.

In such pre-stressed concrete work it frequently happens that it is necessary to splice abutting ends of short lengths of wire strand, in order to save remnants of the wire strand which are not long enough to extend entirely through the concrete structure.

The present invention pertains to a coupling for such splicing of the opposed ends of wire strand, wherein the chucks ordinarily attached to opposite ends of the wire strand may be attached to opposed ends of two lengths of wire strands to be spliced.

The improved coupling to which the invention pertains is in the form of a housing for receiving and holding the chucks upon opposed ends of the wire strand, and is formed of two similar halves, each of which is indicated generally at 16.

Figure 5:
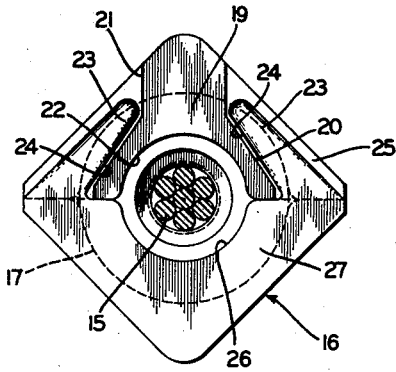
FIG. 5 is an end elevation thereof.
Figure 2:
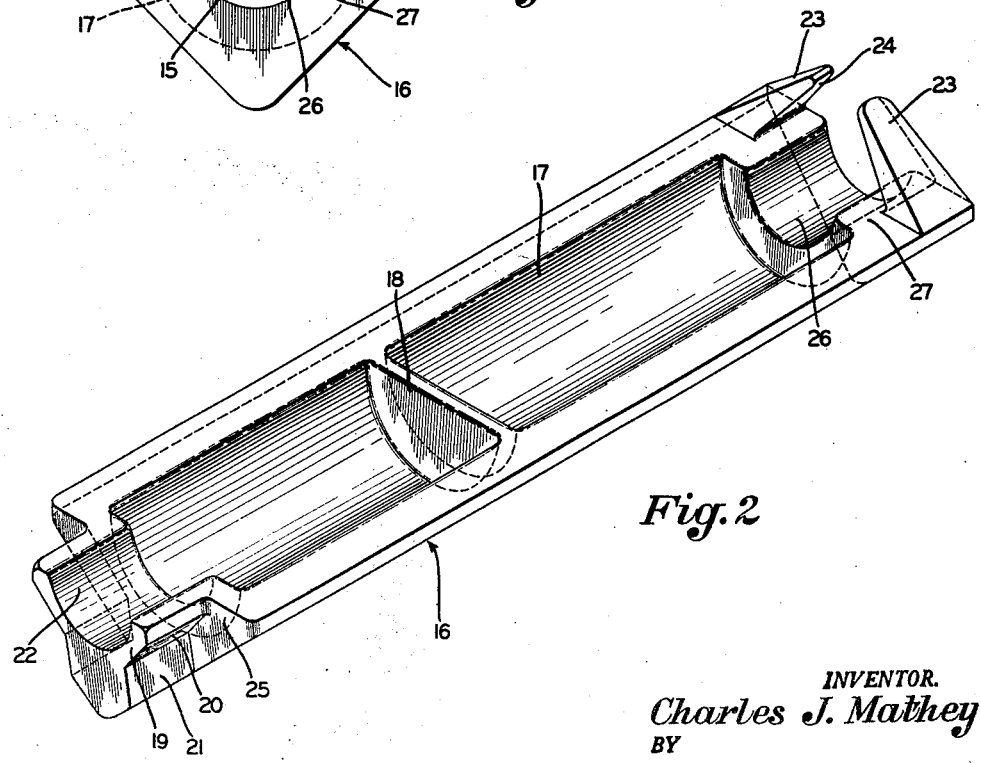
FIG. 2 is a detached perspective view of one half of the coupling housing.

The exterior of each half of the coupling may be of any desired shape, and is shown in the drawings as having a right angle triangular cross section, so that when the two halves are assembled together, as shown in FIG. 5, the exterior cross section of the improved coupling is square.

A longitudinally disposed semi-cylindrical recess or pocket 17 is formed in each half of the coupling housing, being of a diameter sufficient to accommodate the chucks shown in FIG. 1. A transverse partition 18 is provided within each half of the coupling housing, this partition being preferably located at a point spaced between the center and one end of the coupling.

A boss 19 is formed upon one end of each half 16 of the coupling, the sides thereof converging toward the exterior of the coupling, as indicated at 20, and terminating in the rib 21. A half-round recess 22 is formed in the inner side of this boss and through the adjacent end wall 25.

At the opposite end of each half 16 of the coupling, a pair of converging ears 23 is formed, the inner surfaces 24 of which are shaped to receive the boss 19 on the other half of the coupling, as best shown in FIGS. 4 and 5. A reduced half-round recess 26, corresponding in size and shape to the recess 22, is formed in this end wall 27 of each half 16 of the coupling.

In order to splice two lengths of wire strand together with the improved coupling, a chuck as indicated generally at G is attached to each of the opposed ends of the two lengths of wire strand to be spliced.

The two opposed chucks G are placed within the cylindrical pocket 17 of one half 16 of the coupling. The other half of the coupling is then placed thereon and the two halves are slidably moved longitudinally relative to each other so as to engage the lug 19 of each half of the coupling between the ears 23 of the other half thereof locking the two halves 16 together as shown in FIGS. 3, 4 and 5.

After the two halves 16 of the coupling have been thus assembled, with the chucks G enclosed therein, opposed ends of the lengths of wire strand to be spliced may be inserted into opposite ends of the coupling and into the corresponding chucks G therein, whereby the lengths of wire strand are gripped in the respective chucks and spliced together in the coupling.

As best shown in FIG. 3, when the spliced wire strand 15 is placed in tension, the chucks G will be pulled toward opposite ends of the hollow interior 17 of the coupling. The transverse partitions 18 of the two halves of the coupling being spaced from each other will act as stops to limit inward movement of the wire strand and of the two chucks G within the housing.

From the above it will be obvious that a simple, inexpensive and easily operated coupling is provided for splicing opposed ends of wire strand and the like, in which the usual chucks attached to opposite ends of the wire strand in pre-stressed concrete work may be connected to opposed ends of two lengths of the wire strand to be spliced, and enclosed within the improved housing, the two halves of which may be slidably moved into interlocking engagement with each other.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A coupling for two lengths of wire strand and the like, comprising similar chucks fixed upon opposed ends of the two lengths of wire strand, each of said chucks comprising a cylindrical sleeve having an internal bore tapered toward one end, a plurality of segmental jaws located in said bore, each jaw having a tapered outer surface and a longitudinal recess arcuate in cross section and provided with serrations, means for holding said jaws in assembled condition upon one opposed end of wire strand, an elongated housing in which the chucks are located in spaced longitudinal alignment, said housing comprising two similar elongated hollow halves, each half of the housing comprising an elongated member having a semi-cylindrical recess therein, an end wall with a reduced opening therein at each end of each elongated member, a longitudinally disposed boss on the outer side of one end of each elongated member, a pair of transversely disposed converging ears on the inner side of the other end of each elongated member for interlocking engagement with the boss on the other elongated member, the chucks being spaced apart and located in opposite ends of the housing and coupled therein by contact with the respective end walls, the wire strands being located through said reduced openings.

2. A coupling fo two lengths of wire strand and the like, comprising similar chucks fixed upon opposed ends of the two lengths of wire strand, each of said chucks comprising a cylindrical sleeve having an internal bore tapered toward one end, a plurality of segmental jaws located in said bore, each jaw having a tapered outer surface and a longitudinal recess arcuate in cross section and provided with serrations, an annular groove in the larger end of said plurality of segmental jaws, a resilient ring located in said annular groove for holding said jaws in assembled condition upon one opposed end of wire strand, an elongated housing in which the chucks are located in spaced longitudinal alignment, said housing comprising two similar elongated hollow halves, each half of the housing comprising an elongated member having a semi-cylindrical recess therein, an end wall with a reduced opening therein at each end of each elongated member, a longitudinally disposed boss on the outer side of one end of each elongated member, a pair of transversely disposed converging ears on the inner side of the other end of each elongated member for interlocking engagement with the boss on the other elongated member, the chucks being spaced apart and located in opposite ends of the housing and coupled therein by contact with the respective end walls, the wire strands being located through said reduced openings.

3. A coupling for two lengths of wire strand and the like, comprising similar chucks fixed upon opposed ends of the two lengths of wire strand, each of said chucks comprising a cylindrical sleeve having an internal bore tapered toward one end, a plurality of segmental jaws located in said bore, each jaw having a tapered outer surface and a longitudinal recess arcuate in cross section and provided with serrations, means for holding said jaws in assembled condition upon one opposed end of wire strand, an elongated housing in which the chucks are located in spaced longitudinal alignment, said housing comprising two similar elongated hollow halves, each half of the housing comprising an elongated member having a semi-cylindrical recess therein, an end wall with a reduced opening therein at each end of each elongated member, a longitudinally disposed boss on the outer side of one end of each elongated member, a pair of transversely disposed converging ears on the inner side of the other end of each elongated member for interlocking engagement with the boss on the other elongated member, a transverse partition wall on each elongated member and located closer to one end thereof than the other, the chucks being spaced apart and located in opposite ends of the housing and coupled therein by contact with the respective end walls, the wire strands being located through said reduced openings.

4. A coupling for two lengths of wire strand and the like, comprising similar chucks fixed upon opposed ends of the two lengths of wire strand, each of said chucks comprising a cylindrical sleeve having an internal bore tapered toward one end, a plurality of segmental jaws located in said bore, each jaw having a tapered outer surface and a longitudinal recess arcuate in cross section and provided with serrations, means for holding said jaws in assembled condition upon one opposed end of wire strand, a cap connected to said sleeve at the larger end of said bore, a spring interposed between said cap and the plurality of segmental jaws, an elongated housing in which the chucks are located in spaced longitudinal alignment, said housing comprising two similar elongated hollow halves, each half of the housing comprising an elongated member having a semi-cylindrical recess therein an end wall with a reduced opening therein at each end of each elongated member, a longitudinally disposed boss on the outer side of one end of each elongated member, a pair of transversely disposed converging ears on the inner side of the other end of each elongated member for interlocking engagement with the boss on the other elongated member, the chucks being spaced apart and located in opposite ends of the housing and coupled therein by contact with the respective end walls, the wire strands being located through said reduced openings.

References Cited in the file of this patent
UNITED STATES PATENTS

| | | |
|---|---|---|
| 575,641 | Gerard | Jan. 19, 1897 |
| 1,159,567 | Burton | Nov. 9, 1915 |
| 2,052,958 | Webb | Sept. 1, 1936 |
| 2,166,457 | Berndt | July 18, 1939 |
| 2,209,620 | Berndt et al. | July 30, 1940 |
| 2,535,623 | Becker | Dec. 26, 1950 |
| 2,855,090 | Zebley | Oct. 7, 1958 |